Oct. 24, 1944. A. HOLLINS ET AL 2,361,204
CONTROL SWITCH ASSEMBLY
Original Filed May 23, 1940 2 Sheets-Sheet 1
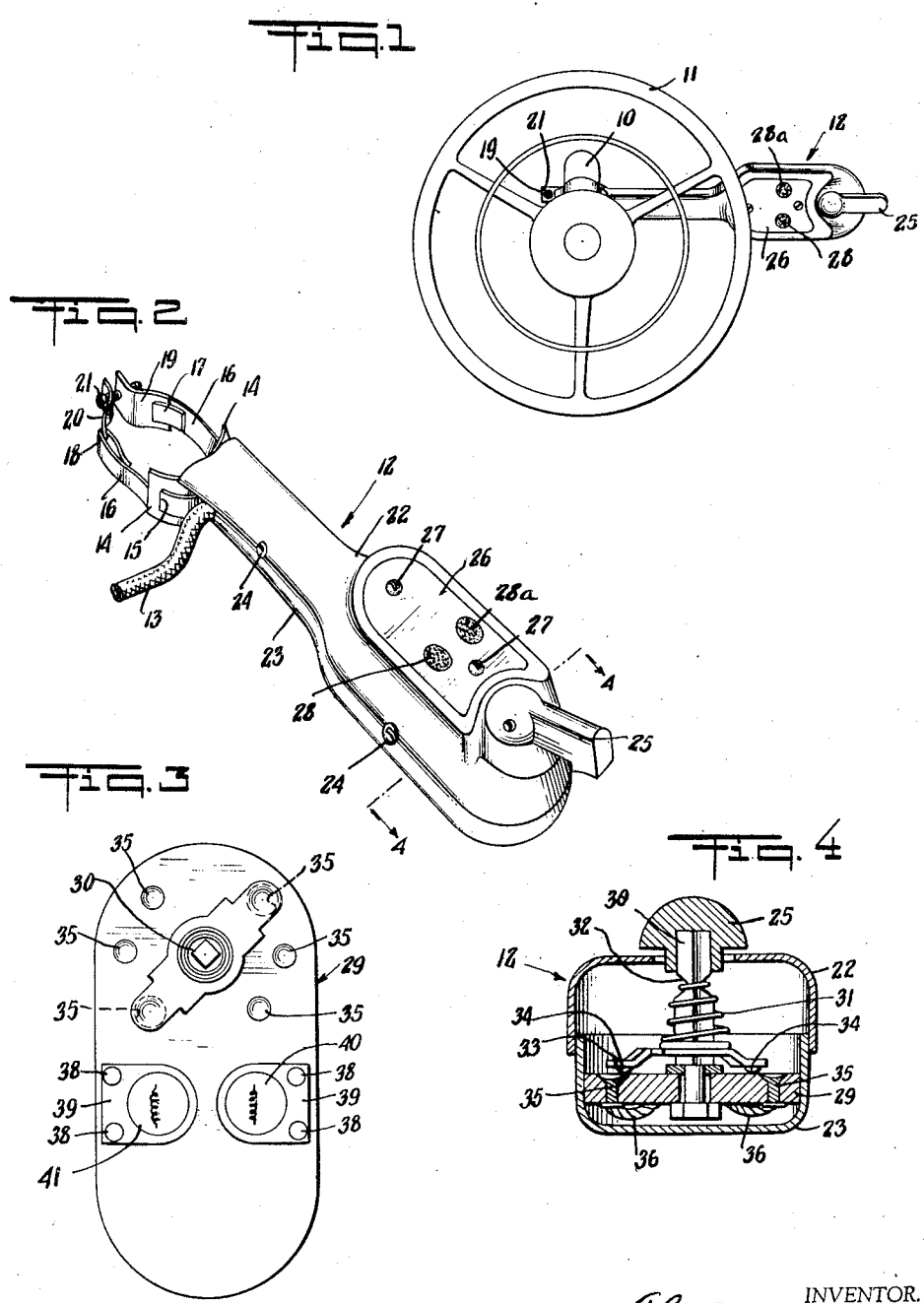

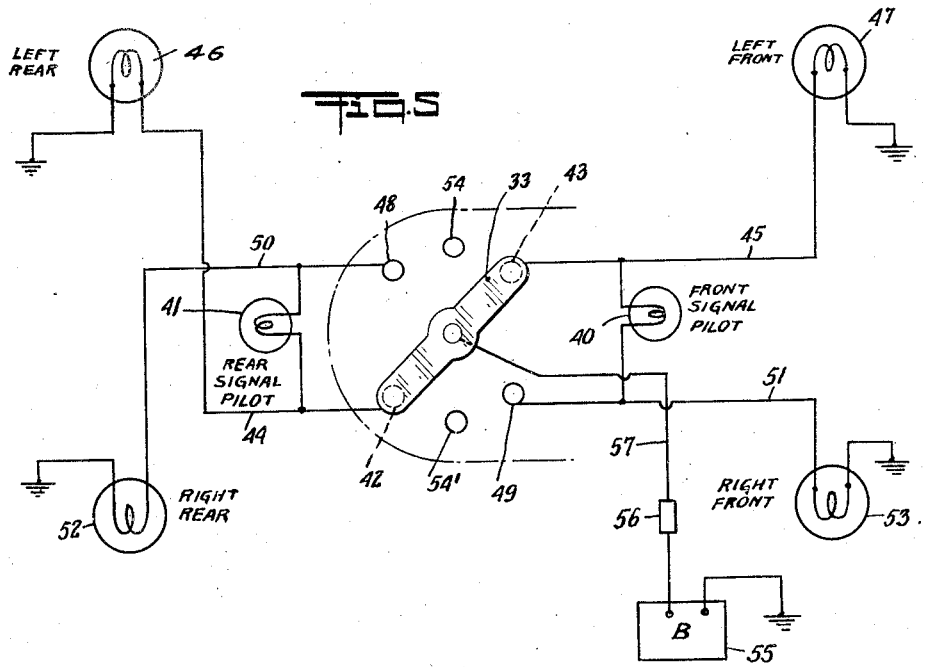
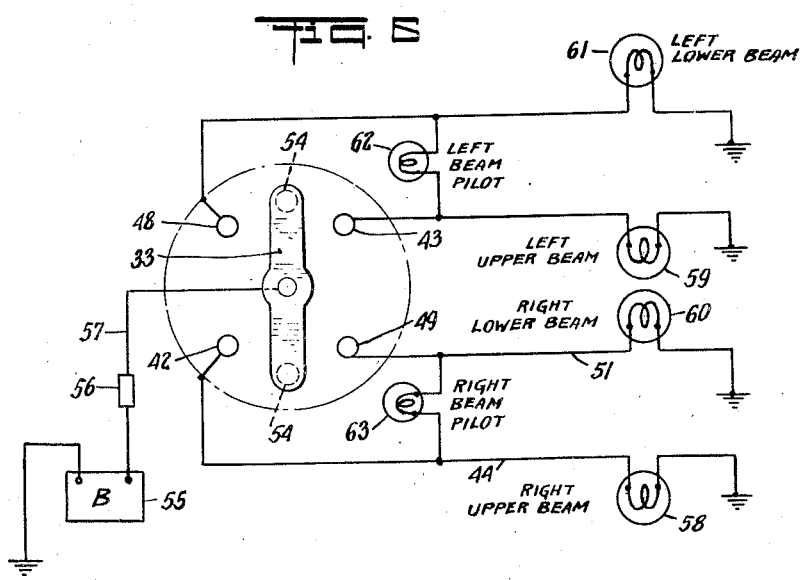

Patented Oct. 24, 1944

2,361,204

UNITED STATES PATENT OFFICE 2,361,204

CONTROL SWITCH ASSEMBLY

Abraham Hollins and Jesse Hollins,
Brooklyn, N. Y.

Original application May 23, 1940, Serial No. 336,850. Divided and this application December 2, 1941, Serial No. 421,280

1 Claim. (Cl. 177—329)

This invention relates to improvements in signalling systems, and more particularly to a novel control switch assembly for pilot indicating arrangements in direction signalling or lamp installations on vehicles. This application is a division of our application Serial Number 336,850, filed May 23, 1940, entitled "Signaling systems."

Prior pilot indicators were dependent upon relays to indicate failure of directional signal lamps or headlights. Relays used in the directional switching circuits were always a source of trouble, with service difficulties arising. If the signals or lamps were left on too long, the relays would overheat, burn out, or otherwise fail. In accordance with my present invention, we provide a control switch assembly for a signalling circuit employing pilot lights operated without any relay, overcoming such difficulties of prior devices. Our novel system may also be used to effectively indicate beam or headlight failure on vehicles. The circuit arrangements are simple, foolproof, practical, and inexpensive as compared with prior systems.

It is accordingly an object of the present invention to provide a novel switch mechanism for use in signalling system for vehicles, which positively indicates failure of directional signals therein.

Another object of the invention is to provide a novel signal device incorporated in the switch mechanism for indicating the operative condition of vehicle headlights.

These and further objects of the present invention will become more evident in the following description of preferred embodiments thereof illustrated in the drawings, in which:

Figure 1 is a plan view of a steering wheel with the switch control arm of the invention attached thereon.

Figure 2 is a perspective illustration of the control switch of Figure 1.

Figure 3 is a plan view of the switch plate, showing the construction thereof.

Figure 4 is a vertical cross-sectional view taken along line 4—4 of Figure 2 through the switch control arm.

Figure 5 is a schematic circuit diagram of the directional switching system connected with two pairs of directional signal lamps.

Figure 6 is a schematic circuit diagram of a modified directional switching system connected with upper and lower pairs of headlights of a motor vehicle.

Referring more particularly to Figures 1 to 4, the control switch arrangement generally designated at 12, is shown fastened on the steering column 10 of a motor vehicle adjacent steering wheel 11 thereof. Electric cable 13 extends from arm 12 for connection to the remainder of the system, as will be described.

The control switch arm arrangement 12 is provided at one end with two opposed bracket elements 14, 14 having slots 15. A flexible band 16 is drawn through slots 15, 15. The open end of band 16 are drawn through vertical slots 17 and 18 provided respectively on two bracket members 19 and 20. Band 16 is adjustable to the required length. A screw 21, provided with a nut, is used to readily fasten the bracket arrangement and arm onto steering column 10.

Control switch arm 12 comprises removable cover plate 22 and lower cover plate 23, joined together by screws 24. A switch lever 25 is rotatably arranged at the free end of arm 12. Lever 25 operates in three different positions. A top plate 26 is arranged on cover 22, removably fastened thereon by screws 27. Two openings in plate 26 have windows 28, 28a through which pilot lamps to be described are viewed. A base plate 29 is mounted within lower cover 23, and contains switching members. Switch lever 25 is fastened on a squared projecting end of shaft 30 rotatably mounted on base plate 29. One end of spring 31 is fastened in a recess 32 on shaft 30.

Spring 31 is arranged to press switch arm 33 against switch contacts 35 on base 29. Switch armature 33 is secured to shaft 30 and provided with projecting nibs 34 coactable with contacts 35, in turn electrically connected to the system circuit by wires 36. Three pairs of contact members 35, 35 are provided, corresponding to the three positions of switch lever 25, for the purpose to be presently described. Pilot lamp sockets 39 are fastened onto plate 29 by screws 38. Two pilot lamps 40 and 41 are screwed into respective sockets 39.

A preferred circuit diagram in accordance with my present invention is shown in Figure 5. Contact element 42 of a circle of spaced switch contacts, is connected by lead 44 to the left rear signal lamp 46, which in turn is grounded. Contact element 43 is connected to the left front directional signal lamp 47. The right rear signal lamp 52 is connected by lead 50 to contact element 48. The right front signal lamp 53 is connected to contact element 49 by lead 51. Two contact elements 54, 54' are unconnected and correspond to the neutral position of switch armature 33. The vehicle battery 55, has one terminal grounded and is connected through fuse 56 to switch armature 33 by lead 57. It is to be understood that directional signal lamps 46, 47, 52 and 53 are mounted in and are enclosed with suitable directional casings in appropriate positions on the vehicle body to indicate the projected direction of turning of the vehicle to the left or right by corresponding signal lamps lighting up.

When lever 55 of switch structure 12 is turned to move switch armature 33 to the position shown in Figure 5, contact elements 42 and 43 are connected with battery 55. The current flows to both left rear signal lamp 46 and left front signal lamp 47 through leads 44 and 45 respectively; the electrical circuit connections being completed through ground. Rear signal pilot light 41 is connected across left rear signal lamp 46 and right rear signal lamp 52 between leads 44 and 50. Similarly, the front signal pilot light 40 is connected between leads 45 and 51, in circuit with left front signal lamp 47 and right front signal lamp 53.

When switch armature 33 is in the position shown in Figure 5, current flows through switch armature 33, through pilot light 41, through lead 50 and through right rear signal lamp 52 to ground. The filaments of pilot lights 40 and 41 are of a higher resistance than any of the directional signal lamps 46, 47, 52 or 53. Current will flow through pilot lights 40 and 41, completing its circuit to ground through the associated unlighted directional signal lamp. The pilot lamps will thus both light up as long as the corresponding unlit directional signal lamp filaments are intact. Thus, when switch armature 33 is in the position of Figure 5, both left directional signal lamps 46 and 47 will light up, and simultaneously both pilot lights 40 and 41 will also light up. This condition signifies that the respective unlit signal lamps 52 and 53 are in operative condition.

When switch armature 33 in turned in a counterclockwise direction by lever 25 connecting with contact elements 48 and 49, current from battery 55 flows to right front signal lamp 53 and right rear signal lamp 52. Again, both pilot lights 40 and 41 light up, since current flows from switch armature 33 through lead 50, rear pilot lamp 41, lead 44 and signal lamp 46 to ground, as well as through lead 51, front pilot lamp 40, lead 45, and signal lamp 47 to ground.

When front pilot lamp 40 is unlit, it indicates a failure or break of the right front signal lamp 53 while switch armature 25 is in the position of Figure 5, illuminating the left signal lamps 46, 47. Similarly, when rear pilot lamp 41 is unlit, it indicates failure or break of the right rear signal lamp 52. The advantages of my present invention will accordingly now be evident. No relays are employed for operating the pilot lights and positive indications of the operative condition of the signal lamps is afforded. By correlating the position of switch arm 25 with the pilot lamps located under windows 28, 28a shown in Figures 1 and 2, corresponding to pilot lamps 40, 41 in Figures 3 and 5, the operative condition of the unlit signal lamps is apparent. When a pilot lamp is unlit, it signifies the break or non-connection of the directional signal lamp not operated by switch armature 33, as will now be evident to those skilled in the art. The system is thus foolproof, inexpensive and practical in service.

When the two rear signal lamps 46 and 52 are disconnected, as when a tractor-trailer unit moves without the trailer, the device of the invention is still operative. With switch armature 33 in the position of Figure 5, the circuit to the left front signal lamp 47 is completed through arm 33, contact elements 43 and 45 to ground. Front pilot light 40 is lit up if front right lamp 53 is good. When switch armature 33 is turned to the position connecting battery 55 with lead 51, the circuit of right front signal lamp 53 is completed to ground. Front pilot light 40 again lights up if front left signal lamp is good. With the two rear signal lamps 46 and 52 disconnected, the rear pilot light 41 of course does not light up.

The system of our invention may be readily adapted to any required voltage. This is accomplished merely by proper choice of the signal lamps. Pilot lamps 40 and 41 are of a higher resistance than the directional signal lamp 46, 47, 52, 53. Since no relays or fuses, except a main fuse 56 are used, there are practically no circuit parts besides the lamps which can burn out or get out of order. Relays used in prior signal circuits were a serious cause of trouble in service. When any signal lamp burns out or otherwise cannot light up, this is directly evident to the driver by a corresponding failure of the associated pilot light (40 or 41) to light up. Naturally, if the break is at the pilot light, that will be directly evident too. The result is direct knowledge of any failure in the system, which may be simply remedied. The directional signal arrangement of the invention may be used for any type of directional signal or indicator.

Our novel pilot circuit arrangement may be advantageously used to indicate failure of headlights or beams of the motor vehicle. The schematic circuit diagram of Figure 6 shows its application to two pairs of headlights: left and right upper beams (U. B.) and lower beams (L. B.). Switch armature 33 is shown in the inoperative or neutral position. When switch armature 33 is turned clockwise, contact elements 42 and 43 are connected with battery 55 through lead 57. The circuit for the right upper beam 58 (R-U. B.) is thereupon completed through contact 42 as is that to left upper beam 59 (L-U. B.) through contact 43. When switch armature 33 is turned counterclockwise, contact elements 48 and 49 are connected to battery 55. Right lower beam 60 (R-L. B.) and left lower beam lamp 61 (L-L. B.) are thereupon energized.

Left beam pilot lamp 62 is shown connected between left lower beam lamp 61 and left upper beam lamp 59. Similarly, right beam pilot lamp 63 is connected across leads 51 and 44 of right upper beam lamp 58, and right lower beam lamp 60. The pilot lights 62, 63 accordingly determine the operative condition of the head-lamps or beams without the use of relays. The simple addition of the pilot lamps 62, 63 to the headlamp circuits, as disclosed, serves to indicate to the operator how the beams are functioning. The operator may simply flip the lever connected to switch armature 33, corresponding to lever 25 of Figures 1 and 2, to either position, and if any of the two pilot lights do not light up, he knows that one of the beams is not operating. By correlating the position of the lever (25) with a particular unit pilot lamp (62 or 63), he can directly ascertain which of the four headlamps (58, 59, 60 or 61) is defective.

It is obvious that various changes and modifications may be made to the details of construction of the invention as described, without departing from the broader spirit and scope of the invention, set forth in the following claim:

We claim:

A switch mechanism for controlling the functioning of a directional signal system for motor vehicles and the like, having a plurality of visual signalling devices, paired to function in unison, said switch mechanism, including a housing connectable to a fixed part of the motor vehicle, a switch base contained within said housing, a plurality of fixed contacts carried by said base, in paired relationship, each contact of a pair being connectable to one of a pair of signalling devices, a shaft having bearings in said base, a contact bridging member mounted on said shaft for rotative movement therewith, spring means cooperating with said shaft and said bridging member to urge the latter toward said base, said member being adapted for connection to a source of electrical energy, a lever fixed to said shaft actuatable in one direction to engage said bridging member with one pair of fixed contacts and in the reverse direction to engage said bridging member with another pair of fixed contacts, said lever being further movable to an intermediate position to locate said bridging member in neutral engagement with the remaining pair of fixed contacts, and a pair of lamps supported from said switch base within said switch mechanism housing, adjacent said contacts, each of said lamps being connected to two non-paired contacts, whereby in the use of said mechanism said lamps are adapted to be lighted to indicate the integrity of all of the signalling devices of such system in response to the actuation of said bridging member to either of its two circuit closing positions, an inoperative condition of the pair of signalling devices not connected through said bridging member being visually indicatable by an unlighted lamp within the housing of the switch mechanism.

ABRAHAM HOLLINS.
JESSE HOLLINS.